US012558933B1

(12) United States Patent　　　　(10) Patent No.:　US 12,558,933 B1
Cordray　　　　　　　　　　　　　　(45) Date of Patent:　　Feb. 24, 2026

(54) PIVOTAL COVER FOR BALL HITCH

(71) Applicant: Michael Anthony Cordray, Galveston, TX (US)

(72) Inventor: Michael Anthony Cordray, Galveston, TX (US)

( * ) Notice: Subject to any disclaimer, the term of this patent is extended or adjusted under 35 U.S.C. 154(b) by 0 days.

(21) Appl. No.: 19/233,723

(22) Filed: Jun. 10, 2025

(51) Int. Cl.
　　　*B60D 1/06*　　　　(2006.01)
　　　*B60D 1/60*　　　　(2006.01)
(52) U.S. Cl.
　　　CPC .............. *B60D 1/605* (2013.01); *B60D 1/06* (2013.01)
(58) Field of Classification Search
　　　CPC ................................. B60D 1/605; B60D 1/06
　　　See application file for complete search history.

(56) References Cited

U.S. PATENT DOCUMENTS

| | | | | |
|---|---|---|---|---|
| 3,605,457 A | * | 9/1971 | Foster ...................... | B60D 1/60 |
| | | | | 280/507 |
| 3,876,242 A | * | 4/1975 | Eaton ..................... | B60D 1/065 |
| | | | | D12/162 |
| 5,516,139 A | * | 5/1996 | Woods ..................... | B60D 1/06 |
| | | | | 280/507 |
| 12,123,224 B1 | * | 10/2024 | Kincard ................ | E05B 67/383 |
| 2003/0189313 A1 | * | 10/2003 | Sievers .................. | B60D 1/605 |
| | | | | 280/507 |
| 2009/0302574 A1 | * | 12/2009 | Columbia ................ | B60D 1/06 |
| | | | | 280/507 |
| 2015/0076793 A1 | * | 3/2015 | Belinky ................. | B60D 1/605 |
| | | | | 280/506 |
| 2021/0291602 A1 | * | 9/2021 | Pair .......................... | B60D 1/60 |

* cited by examiner

*Primary Examiner* — Valentin Neacsu
*Assistant Examiner* — Marlon A Arce
(74) *Attorney, Agent, or Firm* — Plager Schack LLP; Mark H. Plager; Naomi Mann

(57)　　　　　　ABSTRACT

A system for covering a trailer ball in a ball hitch mount provides a pivotal cover coupled to the ball hitch mount and configured to pivot between a closed position as for covering trailer ball and an opened position for uncovering trailer ball. Vertical slots are provided in the cover for attachment to a pivot pin installed to the ball hitch mount, wherein the vertical slots enable pivotal as well as translational motion on the pivot pin.

10 Claims, 4 Drawing Sheets

PIVOTAL COVER FOR BALL HITCH

BACKGROUND

The present disclosure relates generally to devices and methods for covering a trailer ball hitch of a ball hitch mount.

SUMMARY

According to various embodiments, disclosed is a system for covering a trailer ball of a ball hitch mount, wherein the system may comprise a pivot cover providing a shell enclosure for housing the trailer ball, the shell enclosure having a top enclosure section, opposing side enclosure sections extending downwards from opposing sides of the top enclosure section, and a front enclosure section, extending downwards from the top enclosure section and between the opposing side enclosure sections. In certain embodiments, a pair of opposing vertical slots are formed within the side enclosure sections, a first vertical slot in the pair of vertical slots being formed in a first side enclosure section of the opposing side enclosure sections and a second vertical slot in the pair of vertical slots being formed in a second side enclosure section of the opposing side enclosure sections. In further embodiments, the pair of opposing vertical slots are configured to receive a pivot pin coupled to the ball hitch mount, wherein the pivotal cover is configured to connect to the ball hitch mount via engagement of the pivot pin through the pair of opposing vertical slots, such that the pivot pin passes through both slots and is in perpendicular alignment to a long axis of the slots, and whereby the pivotal cover is configured to both pivot and slide vertically on the pivot pin when connected to the ball hitch mount via said engagement of the pivot pin through the pair of opposing vertical slots, such the cover may be moved between a closed position for covering the trailer ball, and an opened position for uncovering trailer ball.

In certain embodiments, the pivotal cover has a box or rectangular box shape and includes a top wall forming the top enclosure section, opposing side walls forming the side enclosure sections and extending perpendicularly from the top wall, and a front wall forming the front enclosure section and extending perpendicularly between the top wall and the side walls. In some embodiments, the pivot pin is installed at an underside of the trailer ball mount. In certain embodiments, the pivot pin is installed to a pivot washer coupled to the underside of the trailer ball mount, the pivot washer including a pin sleeve through which the pivot pin is engaged. In some further embodiments, the pivot washer is secured to a threaded post of trailer ball via a nut, the pivot washer including a post slot which is engaged through the threaded post. In certain embodiments, one end of the pivot pin includes an enlarged pin head which is configured to prevent the pivot pin from passing entirely through the pin sleeve, and the other end of the pivot pin includes a cotter pin slot which is configured to receive a cotter pin. In certain embodiments, the pivotal cover further comprising a magnet on an inner side of the front enclosure section, the magnet being configured to magnetically attach the pivotal cover to the trailer ball when the cover is in the closed position.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figures 1, 2:
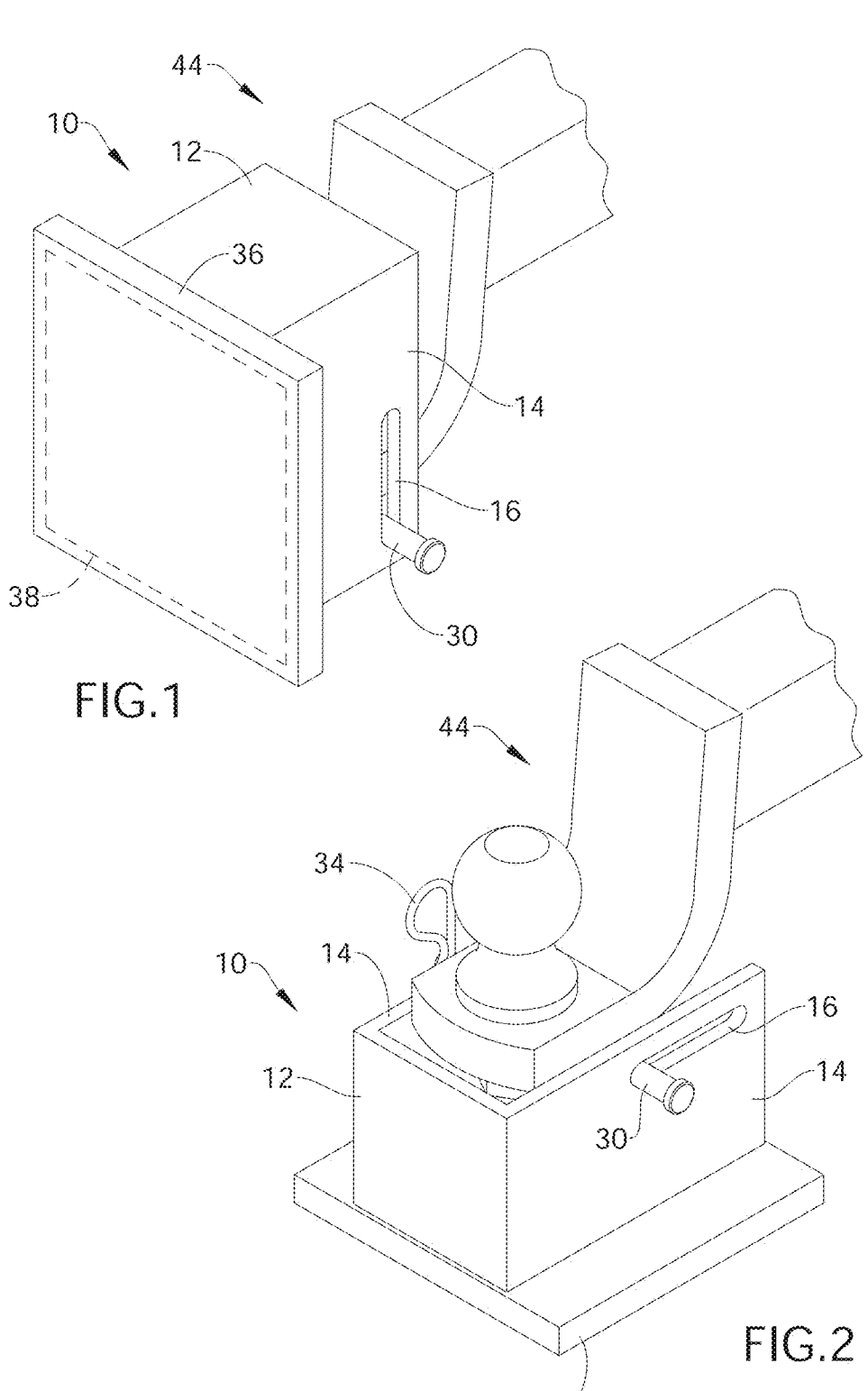
FIG. 1 is a perspective view of a pivotal cover for a hitch ball, shown in a closed position according to certain embodiments.
FIG. 2 is a perspective view showing the pivotal cover in an opened position.
Figure 3:
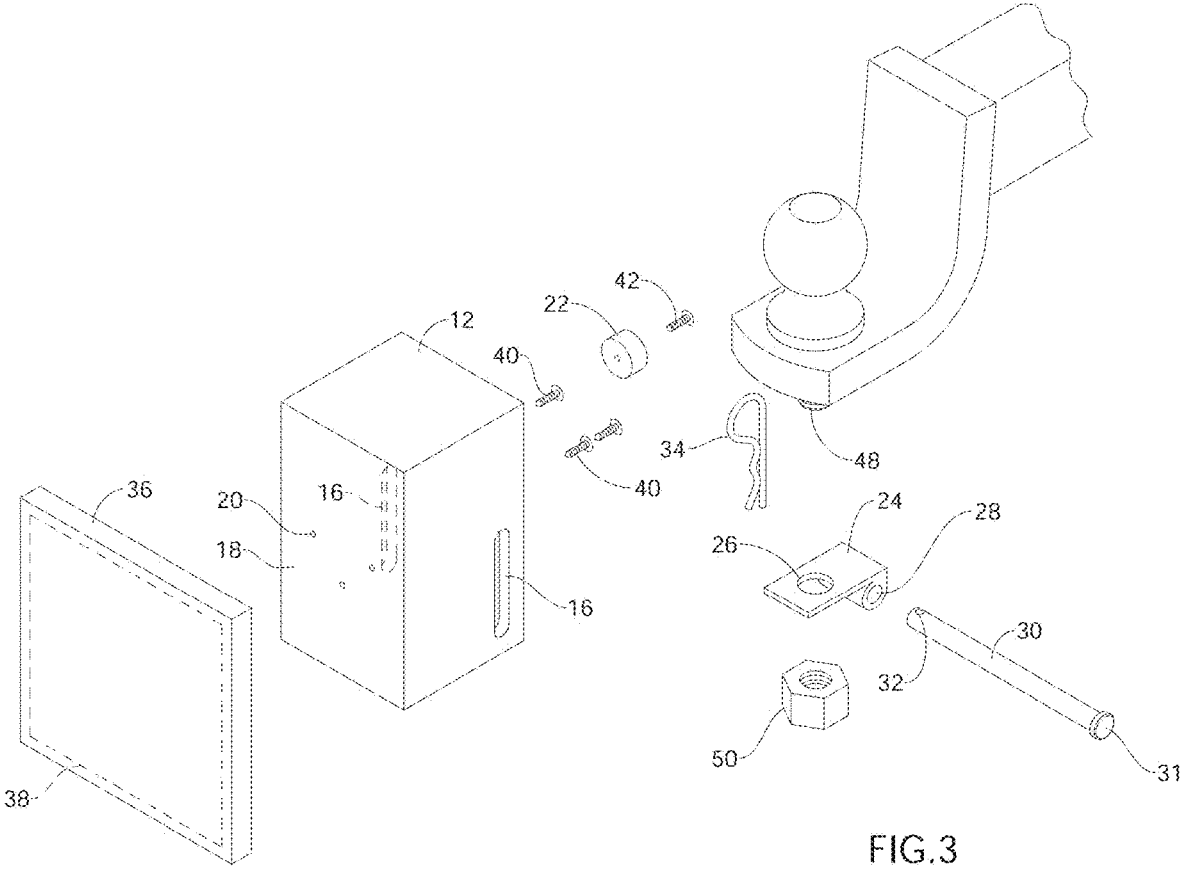
FIG. 3 is an exploded view of the pivotal cover and ball hitch assembly.
Figure 4:
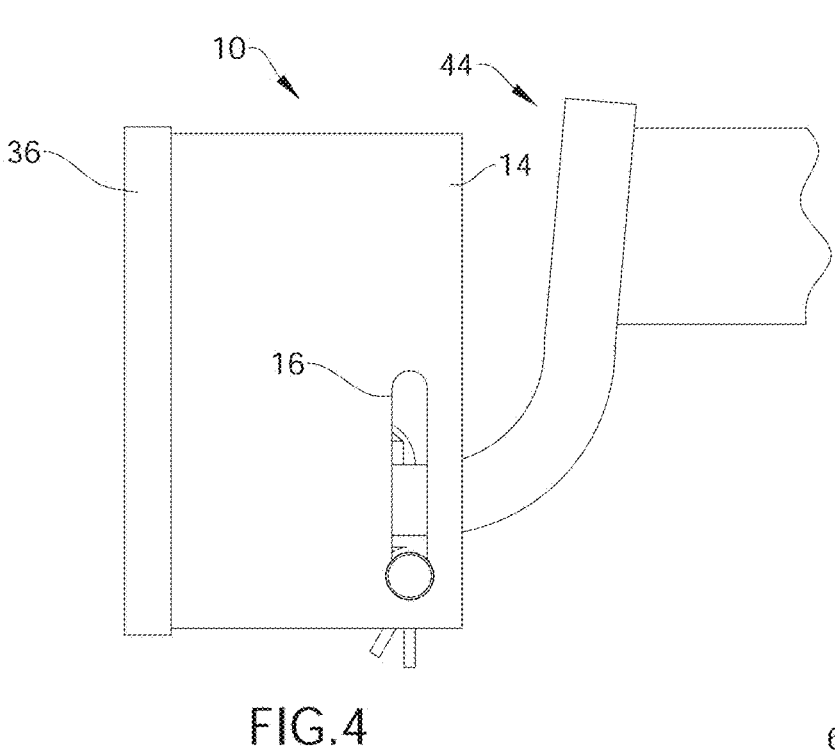
FIG. 4 is a side view of the cover in the closed position.
Figure 5:
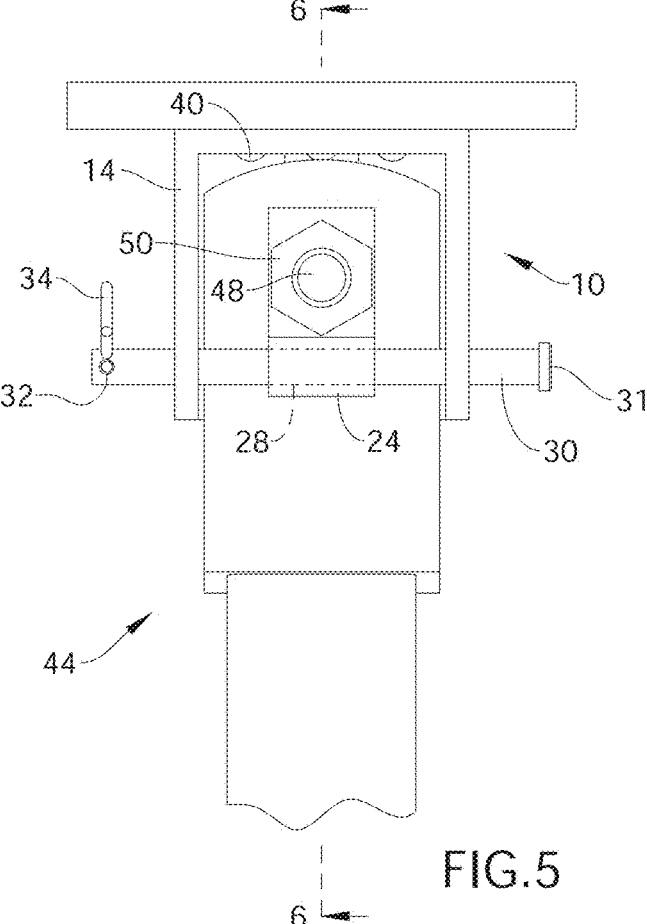
FIG. 5 is a top view thereof.
Figures 6, 7, 8:
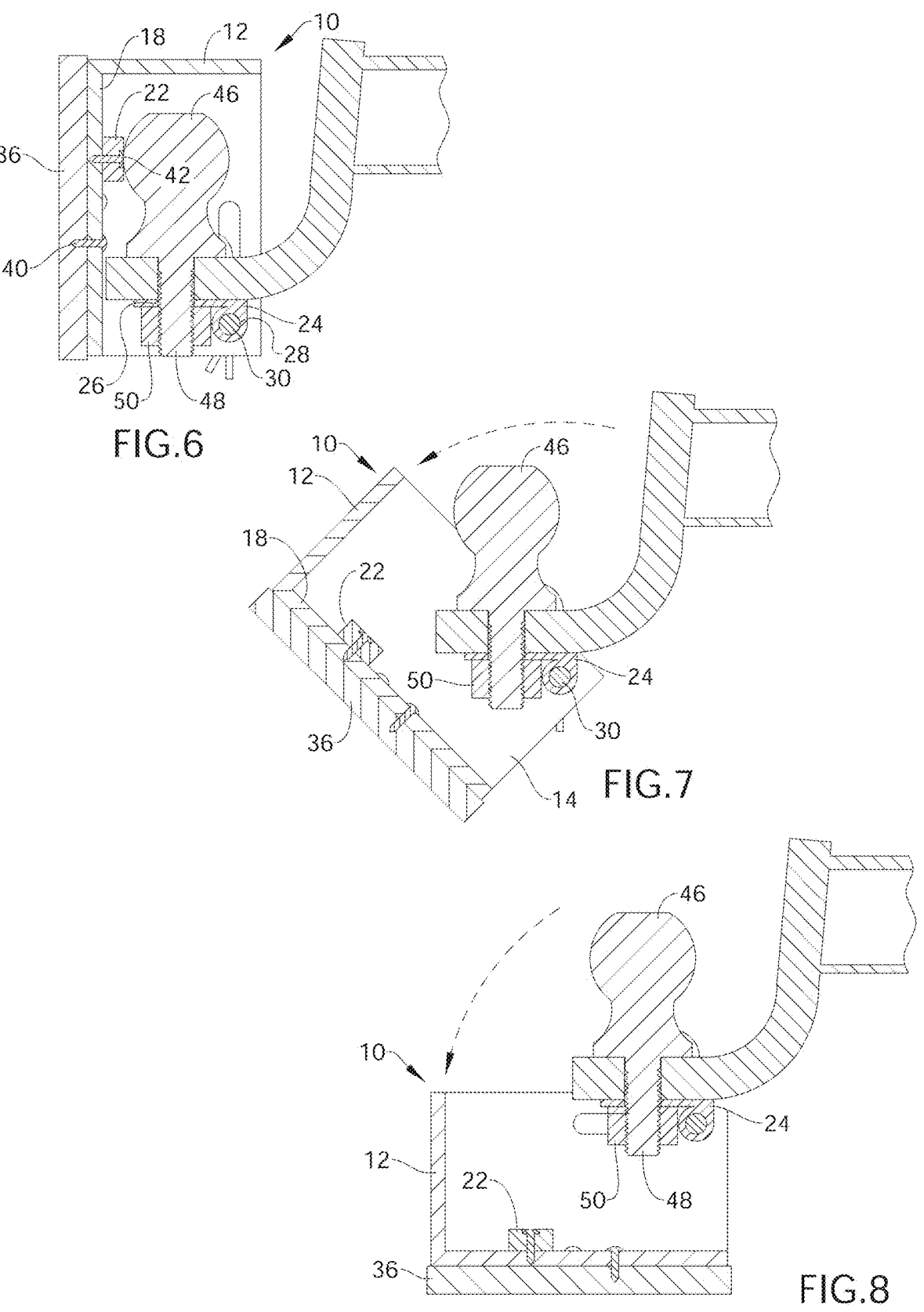
FIG. 6 is a section view taken along line 6-6 in FIG. 5.
FIG. 7 is a section view showing rotation of the cover.
FIG. 8 is a section view, showing the cover fully rotated downwards and pushed back.

According to various embodiments as depicted in FIGS. 1-8, disclosed is a method and/or system for covering a trailer ball 46 in a ball hitch mount 44 utilizing a pivotal cover installed to the ball hitch mount. In some embodiments, pivotal cover 10 is configured to pivot between a closed position as shown in FIGS. 1, 4, 5, and 6 for covering trailer ball 46, and an opened position as shown in FIGS. 2, 7, and 8 for uncovering trailer ball 46. In certain embodiments, cover 10 may comprise a shell enclosure providing an internal hollow for housing trailer ball 46, the shell enclosure having top, front, and side enclosure sections. In some embodiments, cover 10 may have a box or rectangular box like shape and may generally include a top wall 12 forming the top enclosure section, opposing side walls 14 forming the side enclosure sections and extending perpendicularly from top wall 12, and a front wall 18 forming the front enclosure section and extending between and in perpendicular alignment to top wall 12 and side walls 14, wherein walls 12, 14, and 18 may comprise flat plates as shown.

In certain embodiments, vertical slots 16 (also referred to as pin slots) are provided in side walls 14 and are configured to receive a pivot pin 30 installed to the ball hitch mount 44, whereby the pivot pin passes through both slots and is in perpendicular alignment to a long axis of the slots, as depicted. This couples pivotal cover 10 to the hitch mount 44, while allowing said cover to both pivot and slide vertically on the pivot pin 30. As such, cover 10 may be closed over ball 46, (see FIGS. 1 and 6), then rotated frontwards and downwards about pivot pin 30 as depicted in FIG. 7, and lastly slid rearwards on pin 30 as depicted in FIG. 8. In some embodiments, a magnet 22 may optionally be provided on an inner side of front wall 18 and is configured to magnetically attach cover 10 to ball 46 when the cover is in the closed position. This maintains the cover in the closed position until pushed to the opened position to break the magnetic attachment force. Magnet 22 may be permanently affixed to front wall 18, e.g., via a magnet screw 42 as depicted, or other suitable attachment means.

In some embodiments, pivot pin 30 may be installed to a pivot washer 24 provided at an underside of the trailer ball mount. In some embodiments, the pivot washer is configured to attach to a threaded post 48 of trailer ball 46. In one embodiment, pivot washer 24 includes a post slot 26 configured to receive threaded post 48 such that the washer 24 may be secured to the post via a nut 50. Additionally, pivot washer 24 includes a pin sleeve 28 configured to snuggly receive pin 30. In some embodiments, one end of pin 30 may include an enlarged pin head 31 which is configured to prevent pin 30 from passing entirely through pin sleeve 28. The other end of the pin includes a cotter pin slot 32, which is configured to receive a cotter pin 34, whereby the cotter pin 34 is likewise configured to prevent pin 30 from passing through pin sleeve 28. As such, pin 30 and cover 10 may be installed to hitch mount 44 by first attaching pivot washer 24 to threaded post 48 trailer ball 46. Cover 10 may then be positioned over trailer ball 46 with pin slots 16 aligned against the openings of pin sleeve 28. In some embodiments, the positioning of cover 10 in this step may be guided by magnet 22. Thereafter, pivot pin 30 is passed through slots 16 and pin sleeve 28, with the end supporting cotter pin slot 32 being first inserted. Once pivot pin 30 is fully inserted and engaged through both slots 16 and sleeve 28, cotter pin 34 may be inserted through cotter pin slot 32 to fix the pin and cover assembly in place.

In some embodiments, cover 10 may optionally be provided with a cover plate 36 which may include a decorative element on its front side 38 such as a logo, insignia, or other textual/pictorial expression. In one embodiment, cover plate 36 may be attached to a front side of front wall 18, e.g., via cover plate screws 40 engaged through attachment holes 20 in the plate and front wall, or other suitable means.

It shall be appreciated that the disclosed pivotal cover 10 for a trailer ball and/or components thereof may have different configurations in alternate embodiments, and that the components of pivotal cover 10 may comprise any alternative known materials in the field and be of any size and/or dimensions. For example, cover 10 may have different geometric shapes, including rounded walls in alternate embodiments. Furthermore, it shall be appreciated that the components of pivotal cover 10 may be manufactured and assembled using any known techniques in the field.

It shall be understood that the orientation or positional relationship indicated by terms such as "upper", "lower", "front", "rear", "left", "right", "top", "bottom", "inside", "outside" is based on the orientation or positional relationship shown in the accompanying drawings, which is only for convenience and simplification of describing the disclosed subject matter, rather than indicating or implying that the indicated device or element must have a specific orientation or are constructed and operated in a specific orientation, and therefore should not be construed as a limitation of the present invention.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A system for covering a trailer ball of a ball hitch mount, the system comprising:

a pivotal cover providing a shell enclosure for housing the trailer ball, the shell enclosure having a top enclosure section, opposing side enclosure sections extending downwards from opposing sides of the top enclosure section, and a front enclosure section, extending downwards from the top enclosure section and between the opposing side enclosure sections, wherein a pair of opposing vertical slots are formed within the side enclosure sections, a first vertical slot in the pair of vertical slots being formed in a first side enclosure section of the opposing side enclosure sections and a second vertical slot in the pair of vertical slots being formed in a second side enclosure section of the opposing side enclosure sections, wherein the pair of opposing vertical slots are configured to receive a pivot pin coupled to the ball hitch mount, wherein the pivotal cover is configured to connect to the ball hitch mount via engagement of the pivot pin through the pair of opposing vertical slots, such that the pivot pin passes through both slots and is in perpendicular alignment to a long axis of the slots, whereby the pivotal cover is configured to both pivot and slide vertically on the pivot pin when connected to the ball hitch mount via said engagement of the pivot pin through the pair of opposing vertical slots, such the cover may be moved between a closed position for covering the trailer ball, and an opened position for uncovering trailer ball, wherein the pivot pin is installed at an underside of the trailer ball mount, and wherein the pivot pin is installed to a pivot washer coupled to the underside of the trailer ball mount, the pivot washer including a pin sleave through which the pivot pin is engaged.

2. The system of claim 1, wherein the pivotal cover has a box or rectangular box shape and includes a top wall forming the top enclosure section, opposing side walls forming the side enclosure sections and extending perpendicularly from the top wall, and a front wall forming the front enclosure section and extending perpendicularly between the top wall and the side walls.

3. The system of claim 1, wherein the pivot washer is secured to a threaded post of trailer ball via a nut, the pivot washer including a post slot which is engaged through the threaded post.

4. The system of claim 1, wherein one end of the pivot pin includes an enlarged pin head which is configured to prevent the pivot pin from passing entirely through the pin sleeve, and the other end of the pivot pin includes a cotter pin slot which is configured to receive a cotter pin.

5. The system of claim 1, the pivotal cover further comprising a magnet on an inner side of the front enclosure section, the magnet being configured to magnetically attach the pivotal cover to the trailer ball when the cover is in the closed position.

6. A method for covering a trailer ball of a ball hitch mount, the method comprising:

rotating a pivotal cover between a closed position for covering the trailer ball, and an opened position for uncovering trailer ball, the pivotal cover being installed to the ball hitch mount and comprising:

a shell enclosure for housing the trailer ball, the shell enclosure having a top enclosure section, opposing side enclosure sections extending downwards from opposing sides of the top enclosure section, and a front enclosure section, extending downwards from the top enclosure section and between the opposing side enclosure sections, wherein a pair of opposing vertical slots are formed within the side enclosure sections, a first vertical slot in the pair of vertical slots being formed in a first side enclosure section of the opposing side enclosure sections and a second vertical slot in the pair of vertical slots being formed in a second side enclosure section of the opposing side enclosure sections, wherein the pair of opposing vertical slots are configured to receive a pivot pin coupled to the ball hitch mount, such that the pivot pin is passed through both slots in the pair of opposing slots, and is in perpendicular alignment to a long axis of the slots, wherein the pivotal cover is configured to pivot as well as slide vertically on the pivot pin, said pivot pin being connected to the ball hitch mount via said engagement of the pivot pin through the pair of opposing vertical slots for enabling the cover to be moved between said closed position and said opened position, wherein the pivot pin is installed at an underside of the trailer ball mount, and wherein the pivot pin is installed to a pivot washer coupled to the underside of the trailer ball mount, the pivot washer including a pin sleave through which the pivot pin is engaged.

7. The method of claim 6, wherein the pivotal cover has a box or rectangular box shape and includes a top wall forming the top enclosure section, opposing side walls forming the side enclosure sections and extending perpendicularly from the top wall, and a front wall forming the front enclosure section and extending perpendicularly between the top wall and the side walls.

8. The system of claim 6, wherein the pivot washer is secured to a threaded post of trailer ball via a nut, the pivot washer including a post slot which is engaged through the threaded post.

9. The system of claim 6, wherein one end of the pivot pin includes an enlarged pin head which is configured to prevent the pivot pin from passing entirely through the pin sleeve, and the other end of the pivot pin includes a cotter pin slot which is configured to receive a cotter pin.

10. The method of claim 6, the pivotal cover further comprising a magnet on an inner side of the front enclosure section, the magnet being configured to magnetically attach the pivotal cover to the trailer ball when the cover is in the closed position.

* * * * *